UNITED STATES PATENT OFFICE.

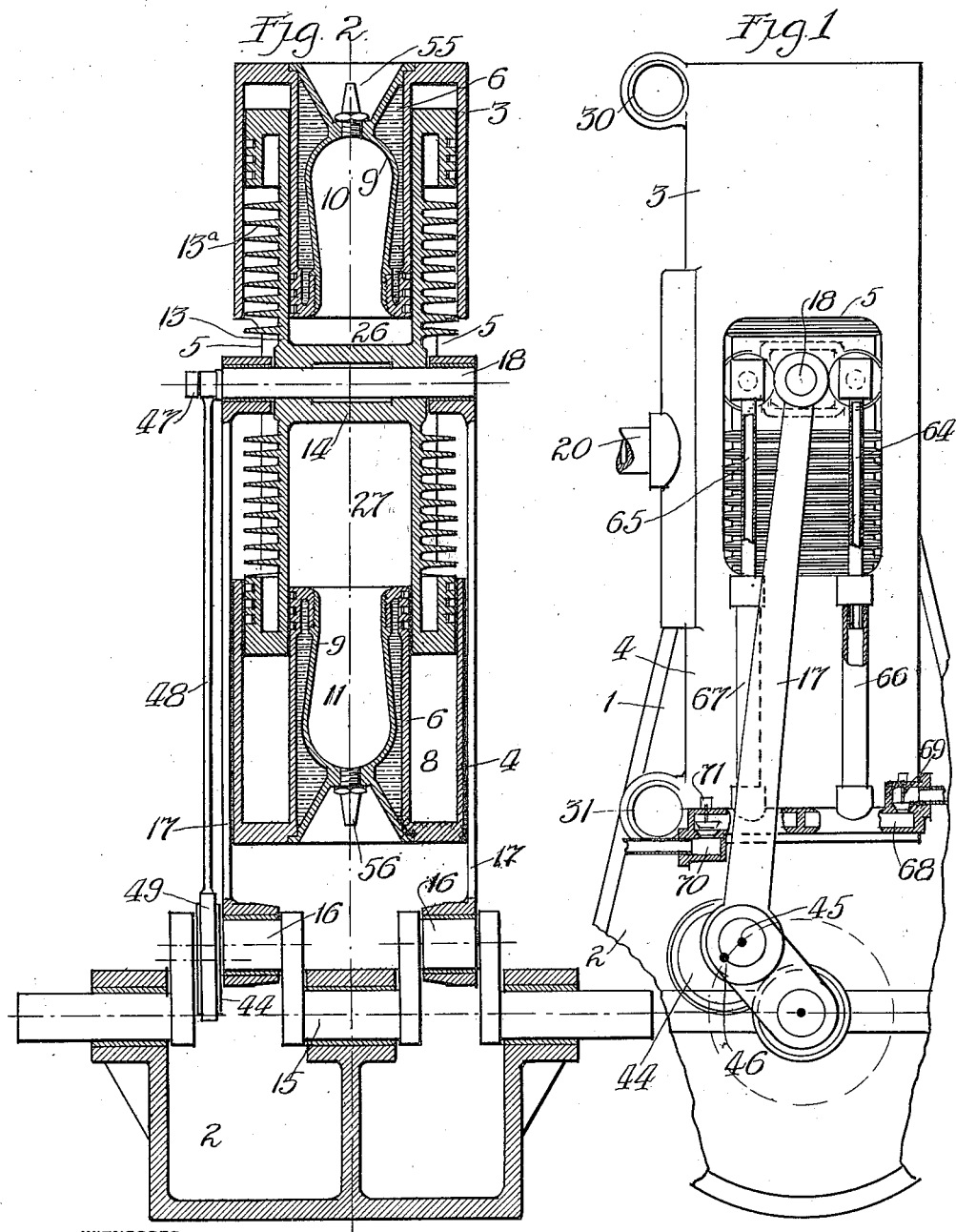

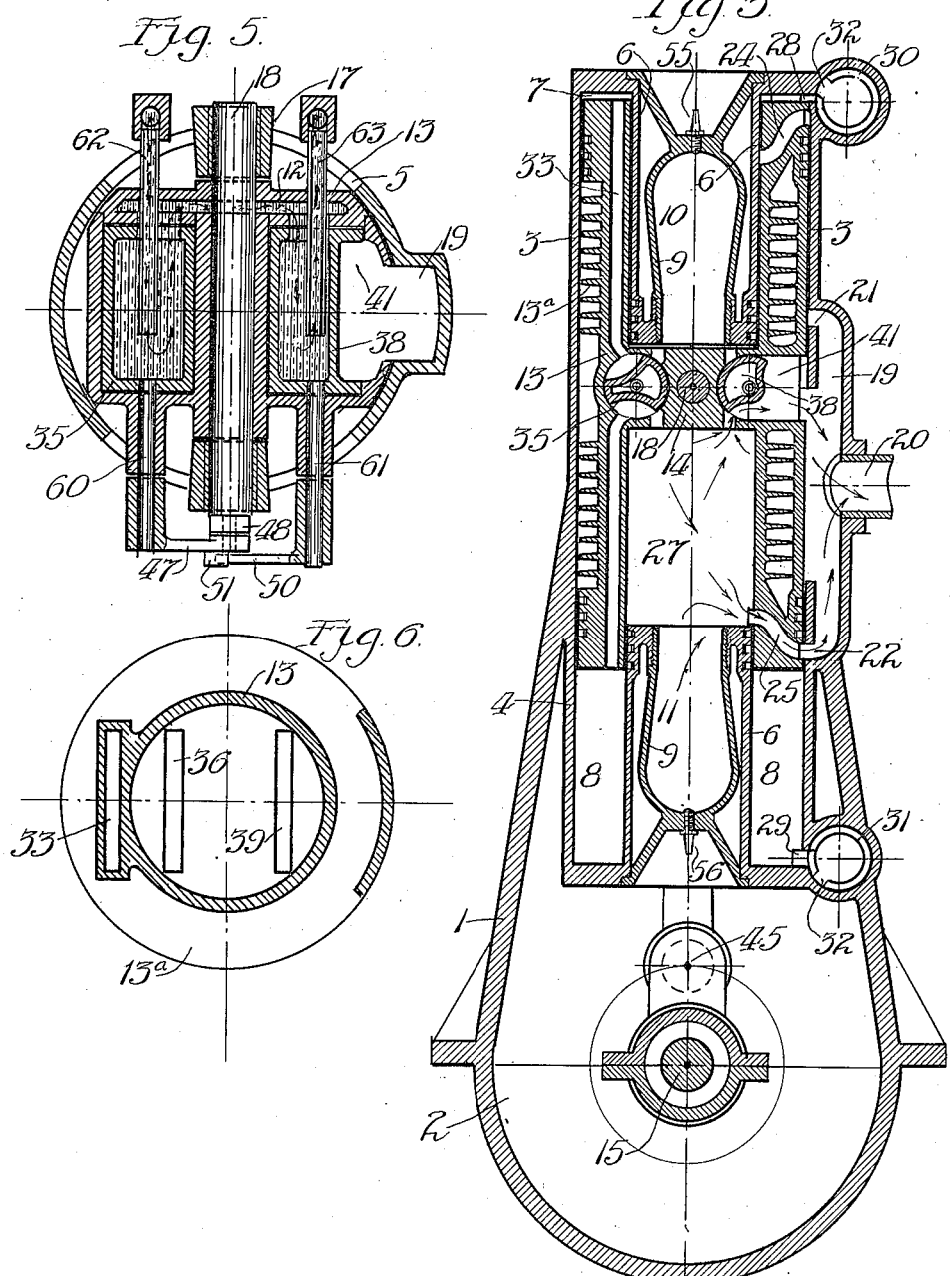

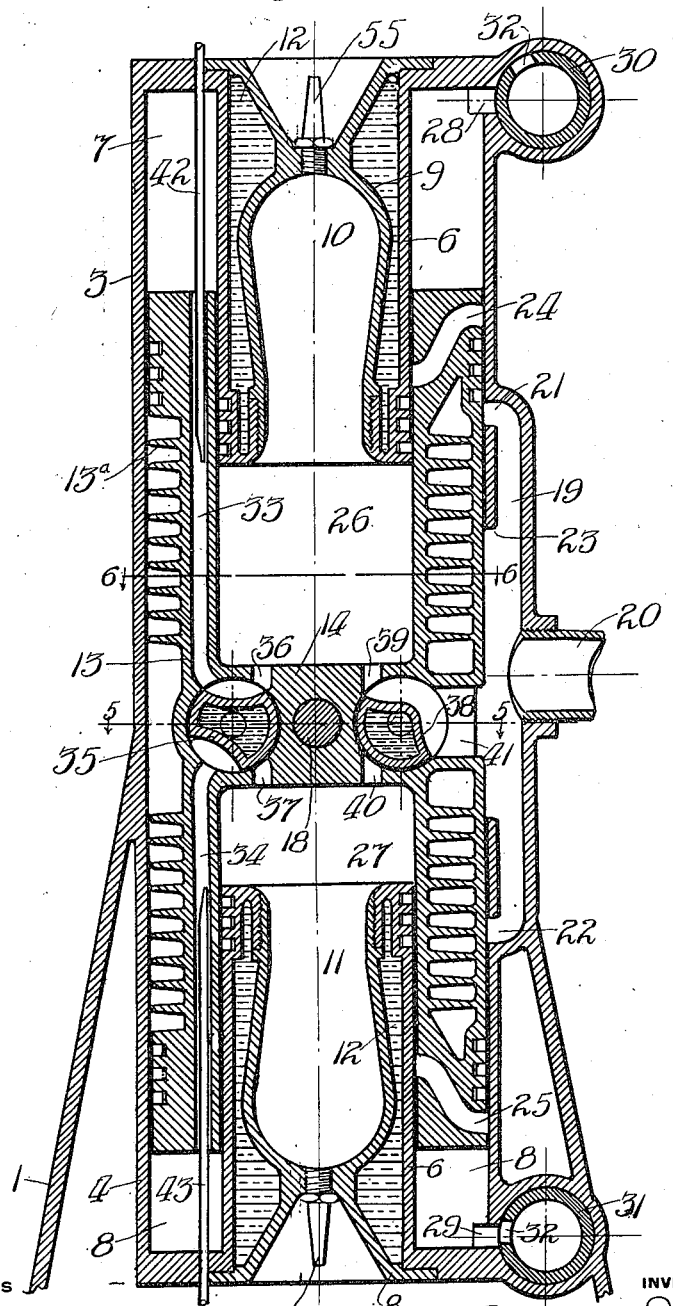

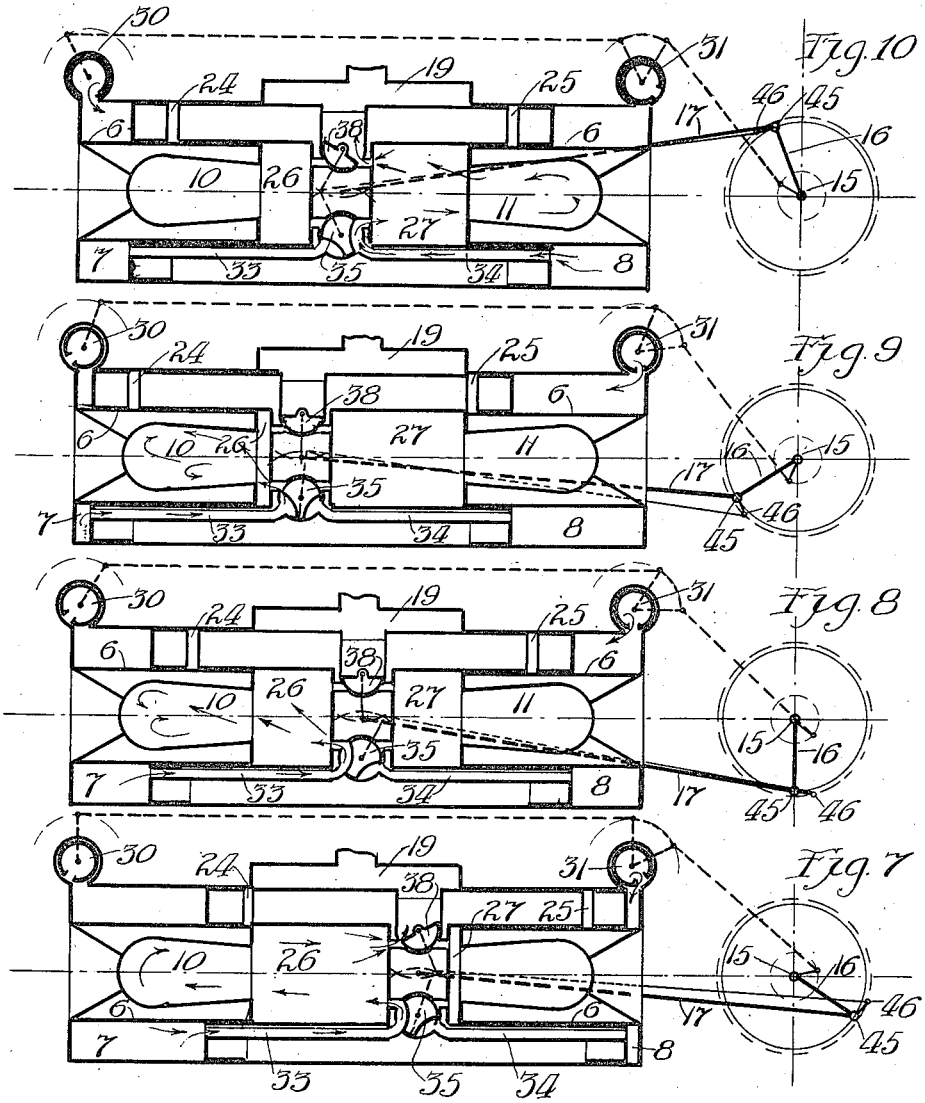

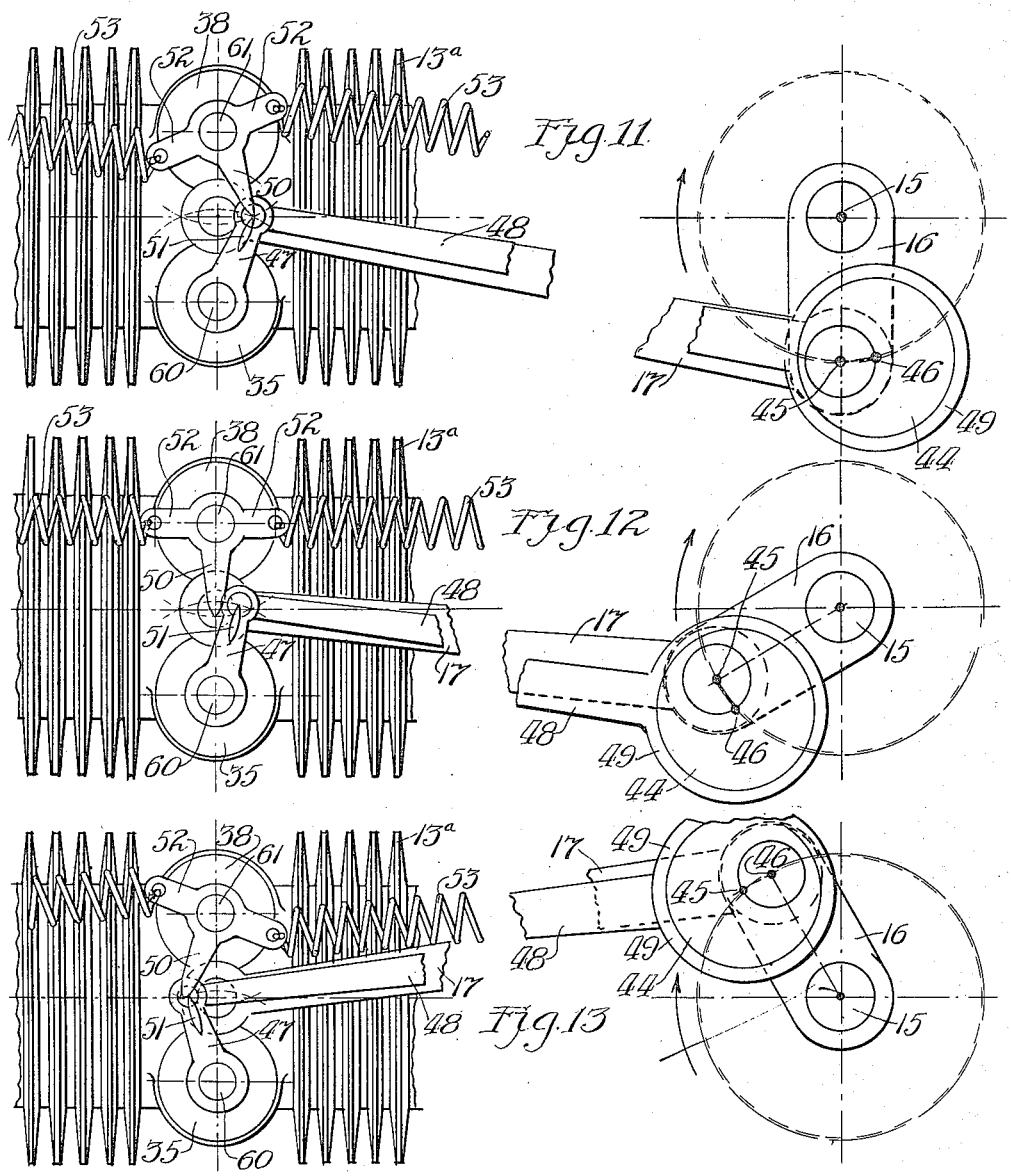

WILLIAM D. EDWARDS, OF PORTLAND, OREGON.

INTERNAL-COMBUSTION ENGINE.

1,208,933.	Specification of Letters Patent.	Patented Dec. 19, 1916.

Application filed August 3, 1912. Serial No. 713,032.

*To all whom it may concern:*

Be it known that I, WILLIAM D. EDWARDS, a citizen of the United States, residing at Portland, county of Multnomah, State of Oregon, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

My invention has for its object to produce a novel form of internal combustion engine in which there will be available for compression a supply of fresh air which is independent of the size of the engine cylinder or of the piston displacement.

A further object of my invention is to produce a novel form of internal combustion engine from which the products of combustion will be fully expelled after each explosion.

A further object of my invention is to produce a novel form of engine in which the various walls bounding the combustion and expansion chamber will be kept clean and cool.

A further object of my invention is to produce a novel construction and arrangement in which the incoming charge will be automatically heated prior to the compression of the same and, in becoming heated, producing a cooling influence upon the working parts.

A further object of my invention is to produce a simple and novel internal combustion engine which will give a plurality of impulses during each revolution of the crank shaft.

A further object of my invention is to produce a double-acting internal combustion engine in which there is no piston rod or corresponding part extending through and working in a head at either end of a combustion chamber.

A further object of my invention is to produce an internal combustion engine in which the greater portion of the spent gases escapes through a piston-controlled port at the end of the working stroke while a second, valve-controlled port is provided for obtaining a final scavenging effect.

A further object of my invention is to produce an engine into which fuel may be injected in the form of a liquid, preferably in atomized state, and be vaporized before final compression.

A further object of my invention is to produce an internal combustion engine having a movable cylinder which is self-cooling.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of an engine arranged in accordance with a preferred form of my invention, parts of the base and crank chamber being broken away; Fig. 2 is a central vertical section in a plane at right angles to the plane of Fig. 1; Fig. 3 is a central vertical section taken at right angles to the plane of Fig. 2, the crank shaft being in a slightly different position than in Figs. 1 and 2; Fig. 4 is a section on a somewhat larger scale of the piston and cylinder and of the engine, the plane being the same as that of Fig. 3 but the parts being shown at a different point in the cycle than in Fig. 3; Fig. 5 is a section on line 5—5 of Fig. 4; Fig. 6 is a transverse section through one of the cylinders on line 6—6 of Fig. 4. Figs. 7, 8, 9 and 10 are diagrams illustrating various stages in a complete cycle; and Figs. 11, 12 and 13 are side elevations of a part of the engine illustrating the conditions of the valves on a movable cylinder or plunger at points in the cycle corresponding to the conditions illustrated in Figs. 8, 9 and 10 respectively.

Referring to the drawings, 1 represents a stationary casing having at the lower end a crank chamber 2 and above the crank chamber 2 cylinders, 3 and 4, the two cylinders being in axial alinement with each other and open at the ends nearest to each other. The casing is cut away on two of the sides between the two cylinders as indicated at 5 in Fig. 1, thus leaving a space through which may project trunnions carried by the movable plunger to be hereinafter described. Extending inwardly from the two heads of the two cylinders are hollow cylindrical projections 6 smaller in diameter than the cylinders 3 and 4 so as to leave annular chambers 7 and 8 in the cylinders 3 and 4 respectively. The projections 6 serve as the pistons of a double-acting engine. Detachably mounted in each of the projections 6 is a member 9 having an intermediate portion smaller in diameter than the interior of the projection and end portions which coöperate with the projection to make a closed annular chamber. Each of the members 9 is made hollow and closed at one end, the upper member being closed at the upper end and the lower member at the lower end; the other ends of these members being open so as to leave within the inner end of each of the stationary piston members a chamber of any desired size and shape, these chambers being indicated at 10 and 11. By making the members 9 detachable, preferably by an axial movement in the outward direction, they can readily be removed and replaced in order to vary the size and shape of the chambers 10 and 11. Within the annular space between the members 9 and the walls of the stationary pistons I introduce cooling water in any suitable way, thus keeping the walls of the pistons and the walls of the chambers 10 and 11 cool.

In the two cylinders 3 and 4 is mounted an elongated hollow plunger 13 having a transverse partition 14 midway between its ends. The exterior diameter of the plunger is the same as the interior diameter of the cylinders 3 and 4 while the interior diameter of the plunger corresponds to the external diameter of the stationary pistons 6. In this way the plunger may be said to comprise two movable cylinders coöperating with two stationary pistons and also two movable pistons operating in the annular chambers 7 and 8. It is not necessary that the plunger be shaped throughout its entire length to fit into the cylinders since it is enough to have a short cylindrical portion at each end of the plunger; and I therefore utilize the intermediate portion of the plunger to provide for automatic cooling. This I accomplish by forming on the plunger a series of thin wide ribs or vanes 13ª which present a large radiating surface movable back and forth through the surrounding atmosphere as the plunger is operated.

The plunger is connected to a suitable crank shaft 15 mounted in the crank casing in any suitable way. In the arrangement shown, I have provided the crank shaft with two cranks 16, a connecting rod 17 extending up beside the cylinder 4 from each of the crank pins and connected at its upper end to a transverse trunnion or shaft 18 carried at the center of the plunger and projecting out through the openings 5 in the casing.

At one side of the casing between the inner ends of the two cylinders 3 and 4 is a channel or passage 19 from which extends an exhaust pipe 20. The upper end of the passage 19 opens into the annular chamber 7 through a port 21 which is just below the upper end of the plunger when the plunger is down. Similarly, the passage 19 communicates at its lower end with the annular chamber 8 through a port 22 which lies just above the lower end of the plunger when the plunger is up. The inner wall of the passage 19 is cut away at the center as indicated at 23 so that throughout this portion of its length the passage is closed on the inner side by the plunger. The plunger is provided at each end with a passage extending through the same as indicated at 24 and 25; the passages being so arranged that when the plunger is down the passage 24 connects the chamber 26 in the upper end of the plunger with the passage 19 through the port 21, and the passage 25 connects the chamber 27 with the exhaust passage through port 22 when the plunger is up. The upper end of the chamber 7 and the lower end of the chamber 8 is each provided with a valve port as indicated at 28 and 29 respectively. These ports serve to admit air or a mixture of air and fuel into the chambers as will hereinafter be described. The valves for controlling the inlet ports may take various forms but I prefer to employ cylindrical valves preferably in the form of hollow cylinders as indicated at 30 and 31 respectively. Each valve has a port 32 through one side so that in a predetermined angular position the interior thereof is in open communication with the port which it controls, while in other angular positions the port is closed. In the plunger are two longitudinal passages 33 and 34, the former leading from the upper end of the plunger to the partition 14 and the other leading from the lower end of the plunger to a corresponding point in the partition. The upper end of the passage 33 is open and the lower end of the passage 34 is also open so that there is always free communication between each of the passages and the annular chamber within which the corresponding end of the plunger moves. At the point where the passages 33 and 34 reach the partition 14 is a valve 35, preferably a rotary valve, and in the partition adjacent to this valve are two ports 36 and 37, the one leading from the valve into the chamber 26 and the other leading from the valve into the chamber 27. The parts are so proportioned that in one position of the valve 35 the passage 33 is connected to the port 36 while in another position of the valve the passage 34 is connected to the port 37; each passage being shut off from the corresponding port when the other passage is in communication with its port. There is a second valve in the partition 14, this being also preferably a rotary valve as indicated at 38; this valve being adapted to connect either a port 39 or a port 40 to a main exhaust port 41 opening from the plunger into the exhaust passage 19. The port 39 opens into the chamber 26 and the port 40 opens into the chamber 27 so that the valve 38 serves to exhaust both of the chambers.

In some cases I propose to introduce a combustible independently of the main inlet ports controlled by the valves 30 and 31, it being quite feasible to do so because the combustible charge flowing into either of the chambers 26 and 27 must pass through one of the long passages 33 and 34 and thus have its temperature raised. This makes it possible to introduce a combustible in the form of a spray which will become vaporized in the passages 33 and 34 so as to enter the chambers 26 and 27 in a gaseous state. To this end I insert through the main cylinder heads elongated tubes 42 and 43, the first of which projects down into the passage 33 and the other up into the passage 34. A liquid combustible may be forced through the tubes 42 and 43 in any suitable manner and be sprayed into the passages 33 and 34 where it comes in contact with the hot walls and is vaporized.

The valves 30 and 31 may be operated in any suitable way from the crank shaft so as to be oscillated in proper time relation to the movement of the plunger. The valves 35 and 38 may also be operated in any suitable way. In the arrangement shown, I have mounted on one of the crank pins an eccentric 44 whose center is a short distance behind the center of the crank pin. In the drawings the center of the crank pins is indicated at 45 and the center of the eccentric at 46. The valve 35 has at one end a radial arm 47 to the outer end of which is connected one end of an eccentric rod 48 which has at the other end a suitable strap 49 surrounding the eccentric. I prefer to operate the valve 38 in such a manner that it will be opened by power derived from the crank shaft but will be closed quickly by means of a spring or springs. The construction whereby I accomplish this is best shown in Figs. 11 to 13. It will be seen that the valve 38 has a three-armed spider at one end, one arm 50 extending down past the arm 47 on the valve 35 and being adapted to be engaged by a cam projection 51 on this arm. The other two arms, 52, of the spider are connected to tension springs 53 which, when free to do so, bring the valve into its closed position: that is the position in which both of the ports 39 and 40 are closed. In operation, the valve 35 is oscillated by the eccentric rod and, in oscillating, it carries with it the arm 50 of the valve 38 until a point is reached where the end of this arm snaps past the cam projection 51, allowing the valve 38 to assume its normal closed position. This action takes place in both directions, the arm 50 being carried to one side of the center when the valve 35 oscillates in one direction and being carried to the opposite side when the valve 35 is moved in the other direction.

The charge in each of the cylinders may be ignited in any suitable way as, for example, by means of spark plugs 55 and 56 extending into the chambers 10 and 11.

I prefer to provide cooling means for the valves 35 and 38 and to this end I make them hollow and circulate a current of water through them in the manner best shown in Figs. 1 and 5. The valves are mounted in cylindrical bores in the partition member of the plunger so that they may be suitably actuated by means of short shafts 60 and 61, projecting from corresponding ends thereof and carrying the actuating arm and spider. Into the opposite ends of the valves extend two tubes 62 and 63, respectively, these tubes extending out beyond the side of the plunger where they are connected to two downwardly extending tubes 64 and 65. The tubes 64 and 65 project into stationary casings or chambers 66 and 67 the first of which opens at the bottom into a discharge pipe 68 having a check valve 69, while the other chamber communicates at its lower end with a suction pipe 70 containing a check valve 71. As the plunger descends, the check valve 71 prevents a back flow through the supply pipe 70, so that water is forced up through the tube 65, through the tube 63, into the valve 38 and, after circulating through the valve, back through a passage 12 in the side of the plunger, into and through the valve 35 and then out through the tube 62 and down through the tube 64 into the discharge pipe. As the plunger rises, back-flow from the discharge side is prevented by the check valve 69 and therefore water will be sucked in through the supply pipe 70 so as to fill the system again.

In describing the operation of the engine I shall refer to the stroke which carries the plunger into the chamber 7 as the outstroke and to the movement in the opposite direction as the in-stroke.

The operation is as follows: In Fig. 7 the plunger is shown just at the beginning of its out-stroke, the valve 31 being open so that air or a mixture of air and combustible may flow into the chamber 8 behind the plunger. The valve 35 is in the position which leaves the passage 33 in communication with the port 36 and shuts off the passage 34 from the port 37. The scavenging valve 38 is covering the port 40 and uncovering the port 39 so that the charge in the chamber 7, assuming that this chamber was filled on the in-stroke of the plunger and that the valve 30 is now closed, flows in through the passage 37 and, following the general direction of the arrows in Fig. 7, sweeps along the walls at one side of the chamber 26 and the chamber 10 and back along the opposite sides to the scavenging valve where it enters the exhaust pipe. Thus the chambers 10 and 26 will be effectually cleared of all spent gases. As the plunger moves out, this sweep of air through the chambers 10 and 26 continues and air continues to be drawn in through the valve 31 into the chamber 8. When the parts reach the position shown in Fig. 8 the scavenging valve closes. Fig. 11 shows the relation of the valve actuating means at the instant the crank reaches the position shown in Fig. 8 and just before the arm 50 on the scavenging valve snaps past the projection 51. At this point the arm 50 is released so that the valve 38 assumes the position shown in Fig. 12 and in Fig. 8. The further outward movement of the plunger now causes the charge in the chamber 7 and in the chambers 26 and 10 to be compressed, the valve 35 gradually closing until the position indicated in Figs. 9 and 12 is reached, at which point the valve 35 is just ready to close and the continued outward movement of the plunger then compresses the charge contained in the chambers 26 and 10 into the chamber 10 which thus constitutes the clearance space for this half of the engine. The charge is now fired and gives a power impulse on the in-stroke. After the crank has passed the center, the valve 35 keeps moving in the same direction as before, passes its neutral position, and begins to open, carrying with it the scavenging valve 38 as indicated in Figs. 10 and 13. It will be seen that in Fig. 9 the exhaust passage 25 in the inner end of the plunger is just about ready to come opposite the inner end of the exhaust passage 19 so that the spent charge in the chambers 11 and 27 is almost completely exhausted, before the plunger starts on its in-stroke. Furthermore, just as the plunger begins its in-stroke, the valve 31 is closed and the valve 30 is opened so that a new charge is drawn into the annular chamber 7 and the charge which has previously been drawn into the chamber 8 now begins to flow through the passage 34, past the valve 35 and into the chambers 27 and 11 as indicated in Fig. 10; the charge sweeping along the walls of the chambers 27 and 11 and passing out through the scavenging valve, so that the remnant of spent gases remaining in the chambers 27 and 11 are driven out and the walls of these chambers are cleaned and cooled. This condition continues until the parts assume the positions indicated in Figs. 10 and 13 and, after a small further angular movement, the scavenging valve is again released and snaps back to its normal position. Just as the plunger is completing its in-stroke, the passage 24 in the outer end thereof comes opposite the inlet port into the exhaust passage 19 and the spent charge is exhausted through the exhaust pipe 20. When the end of the in-stroke is reached, the valve 31 is again opened and the valve 30 closed and the charge which has been compressed in the chamber 11 is fired so as to produce a power impulse on the out-stroke. Just as the plunger starts on its out-stroke the valve 35 begins to move in the direction to open the port 36 and carries with it the scavenging valve as indicated in Fig. 7.

It will thus be seen that a power impulse is obtained during each stroke, there being two power impulses during each revolution of the crank shaft. Furthermore, the combustion and expansion chambers are thoroughly cleared of spent gases, and the walls of the chambers are cleaned and cooled after each explosion. The walls of the stationary pistons and of the clearance chambers therein may be effectually cooled by the circulating medium between them. Each charge, as it enters the combustion and expansion chambers, passes through a long passage in the plunger so that it extracts heat from the plunger, raising its own temperature and lowering that of the plunger. It will also be seen that the main valves carried by the plunger are kept reasonably cool so that they will be reliable in operation and have a long life. It will also be seen that if it is desired to change the size or shape of the clearance chambers, the members 9 may readily be removed without disturbing the other parts of the engine and may be replaced by other members having clearance chambers of the desired size and shape. It will also be seen that there are no bearings for the movable plunger except the cylinders 3 and 4 and the stationary pistons, making the construction extremely simple and efficient.

While I have illustrated and described only a single preferred form of my invention, I do not desire to be limited to the particular structural details thus illustrated and described; but intend to cover all forms and arrangements which fall within the terms employed in the definitions of my invention constituting the appended claims.

I claim:

1. In an engine, a cylinder, a stationary piston projecting inwardly from the head of said cylinder, a hollow plunger movable in said cylinder and fitting around said piston and said plunger having a passage extending through one of its walls to connect the interior of said cylinder around the piston with the interior of the plunger, and a valve carried by said plunger for controlling said passage.

2. In an engine, two stationary alined piston members, a hollow plunger fitting at its ends about said piston members, said plunger having a transverse partition across the same at the center so as to divide the interior thereof into two chambers, a power transmitting device connected to said plunger, a fuel inlet valve carried by said plunger for admitting combustible into either of said chambers.

3. In an engine, two stationary alined piston members, a hollow plunger fitting at its ends about said piston members, said plunger having a transverse partition across the same at the center so as to divide the interior thereof into two chambers, a power transmitting device connected to said plunger, a fuel inlet valve carried by said plunger for admitting combustible into either of said chambers, and means for connecting either of said chambers to atmosphere.

4. In an engine, a member having two alined pistons fixed relative to each other, a member having two alined cylinders fixed relative to each other, each of said pistons fitting into one of said cylinders, a power transmitting device connected to one of said members, a fuel-inlet valve carried by the member to which the power transmitting device is connected, an exhaust valve also carried by the latter member, each of said valves having a neutral position and two operative positions, means tending to hold the exhaust valve in its neutral position, means for actuating the inlet valve, and means associated with the inlet valve for causing the exhaust valve to move with it from the neutral position into each operative position and to be released in the operative position.

5. In an engine, a cylinder, a hollow stationary piston projecting inwardly from the head of said cylinder, a member extending through said head and detachably mounted in said piston and forming therewith a closed chamber extending substantially throughout the entire length of the piston, a cooling medium in said chamber, and a hollow plunger movable in said cylinder and fitting around said piston.

6. In an engine, a cylinder, a hollow stationary piston projecting inwardly from the head of said cylinder, a member extending through said head and detachably mounted in said piston and forming therewith a closed chamber extending substantially throughout the entire length of the piston, a cooling medium in said chamber, and a hollow plunger movable in said cylinder and fitting around said piston, said member having a chamber opening out of the inner end of the piston to form a clearance space and combustion chamber for the engine.

7. In an engine, two open-ended cylinders having their open ends facing each other, stationary pistons in said cylinders, a hollow plunger fitting at its ends in the spaces between the pistons and the cylinders, said plunger having a transverse partition between its ends to divide the interior thereof into two separate chambers, inlet valves for controlling ports leading into said cylinders, a passageway extending from each end of the plunger through one wall thereof and communicating at its inner end with the corresponding chamber in the plunger, and a valve for controlling comunication between each of said chambers and the corresponding passage.

8. In an engine, two open-ended cylinders having their open ends facing each other, stationary pistons in said cylinders, a hollow plunger fitting at its ends in the spaces between the pistons and the cylinders, said plunger having a transverse partition between its ends to divide the interior thereof into two separate chambers, inlet valves for controlling ports leading into said cylinders, a passageway extending from each end of the plunger through one wall thereof and communicating at its inner end with the corresponding chamber in the plunger, and a single rotary valve for controlling communication between each of said chambers and the corresponding passage.

9. In an engine, two open-ended cylinders having their open ends facing each other, stationary pistons in said cylinders, a hollow plunger fitting at its ends in the spaces between the pistons and the cylinders, said plunger having a transverse partition between its ends to divide the interior thereof into two separate chambers, inlet valves for controlling ports leading into said cylinders, a passageway extending from each end of the plunger through one wall thereof and communicating at its inner end with the corresponding chamber in the plunger, a valve for controlling communication between each of said chambers and the corresponding passage, said plunger having an exhaust port provided with branches leading into both of said chambers, and a valve for controlling communication between the exhaust port and said branches.

10. In an engine, two open-ended cylinders having their open ends facing each other, stationary pistons in said cylinders, a hollow plunger fitting at its ends in the spaces between the pistons and the cylinders, said plunger having a transverse partition between its ends to divide the interior thereof into two separate chambers, inlet valves for controlling ports leading into said cylinders, a passageway extending from each end of the plunger through one wall thereof and communicating at its inner end with the corresponding chamber in the plunger, a single rotary valve for controlling communication between each of said chambers and the corresponding passage, said plunger having an exhaust port provided with branches leading into both of said chambers, and a single rotary valve for controlling communication between the exhaust port and said branches.

11. In an engine, two open-ended cylinders having their open ends facing each other, stationary pistons in said cylinders, a hollow plunger fitting at its ends in the spaces between the pistons and the cylinders, said plunger having a transverse partition between its ends to divide the interior thereof into two separate chambers, inlet valves for controlling ports leading into the cylinders, passages connecting the interior of the cylinders with the corresponding chambers in the plunger, and valves controlling said passages.

12. In an engine, a cylinder, a stationary piston projecting inwardly from one end of the cylinder, a hollow plunger fitting at its end in the space between the piston and the cylinder, an inlet valve controlling a port leading into said cylinder, a passageway extending from the interior of the cylinder around the piston through the plunger and communicating with the interior of the plunger, and a valve for controlling said passage.

13. In an engine, a cylinder member, a stationary piston projecting inwardly from one end of the cylinder member, a hollow plunger member fitting in the space between the piston and the cylinder, an inlet valve for controlling a port leading into the cylinder, a passageway extending between the interior of the cylinder member to the interior of the plunger member, one of said members having an exhaust port controlled by the other member for permitting the exhaust of the greater portion of the products of combustion, one of said members having a scavenging port, a valve for controlling the latter port, and means for producing a flow of air along the combustion and expansion chamber toward said scavenging port.

14. In an engine, two open-ended cylinders having their open ends facing toward each other, stationary pistons in said cylinders, a hollow plunger fitting at its ends into the spaces between the pistons and the cylinders and constituting two annular compression pistons operating in said spaces, said plunger having between its ends a transverse partition separating the interior thereof into two chambers, means for admitting air to be compressed into said cylinders, there being an exhaust passage leading from each of the chambers in said plunger to atmosphere, valves controlling said exhaust passages, and means for placing each of said cylinders in communication with the corresponding chamber in the plunger while the corresponding exhaust valve is open.

In testimony whereof, I sign this specification in the presence of two witnesses.

WILLIAM D. EDWARDS.

Witnesses:
J. A. CURREY,
I. B. BANISTER.